(No Model.) 6 Sheets—Sheet 1.

J. C. LOVE.
CONDUIT TRAMWAY.

No. 532,163. Patented Jan. 8, 1895.

Witnesses
John W. Adams
Louis M. Whitehead

Inventor:
John C. Love
by Dayton Poole Brown
his Attorneys.

(No Model.) 6 Sheets—Sheet 3.

J. C. LOVE.
CONDUIT TRAMWAY.

No. 532,163. Patented Jan. 8, 1895.

Witnesses
John W. Adams
Louis K. Whitehead

Inventor
John C. Love
by Dayton Poole & Brown
his Attorneys

(No Model.)

J. C. LOVE.
CONDUIT TRAMWAY.

No. 532,163. Patented Jan. 8, 1895.

Witnesses
John W. Adams
Louis M. F. Whitehead

Inventor:
John C. Love.
by Dayton, Poole & Brown
his Attorneys

(No Model.) 6 Sheets—Sheet 5.

J. C. LOVE.
CONDUIT TRAMWAY.

No. 532,163. Patented Jan. 8, 1895.

Witnesses
John W. Adams.
Louis M. F. Whitehead.

Inventor
John C. Love,
by Dayton Poole & Brown
his Attorneys.

(No Model.) 6 Sheets—Sheet 6.

J. C. LOVE.
CONDUIT TRAMWAY.

No. 532,163. Patented Jan. 8, 1895.

Witnesses
John W. Adams
Louis M. F. Whitehead

Inventor
John C. Love.
by Dayton, Poole & Brown
his Attorneys

UNITED STATES PATENT OFFICE.

JOHN C. LOVE, OF PHILADELPHIA, PENNSYLVANIA, ASSIGNOR TO THE LOVE ELECTRIC TRACTION COMPANY, OF CHICAGO, ILLINOIS.

CONDUIT TRAMWAY.

SPECIFICATION forming part of Letters Patent No. 532,163, dated January 8, 1895.

Application filed September 5, 1893. Serial No. 484,827. (No model.)

*To all whom it may concern:*

Be it known that I, JOHN C. LOVE, of Philadelphia, in the county of Philadelphia and State of Pennsylvania, have invented certain new and useful Improvements in Conduit Tramways; and I do hereby declare that the following is a full, clear, and exact description thereof, reference being had to the accompanying drawings, and to the letters of reference marked thereon, which form a part of this specification.

This invention relates to improvements in conduit tramways of that class comprising a plurality of transverse yokes, tram-rails supported on the outer ends of the yokes and slot-rails forming the sides of the slot of the conduit and also supported on said yokes.

Most of the features of construction included in my invention are applicable to conduit tramways generally, whether organized for operation in connection with a cable or provided with electrical conductors arranged within the conduit. Certain of the features herein shown and claimed, however, are devised with special reference to conduits adapted for electrical railways, and other features are intended for application to the system of electric traction set forth in prior patents granted to me, the accompanying drawings illustrating as located within the conduit, electrical conductors and supporting devices therefor, such as are shown in the prior patent, No. 463,197, granted to me on the 17th day of November, 1891.

In the accompanying drawings illustrating my invention.

The yokes A of the conduit are designed to support both the slot-rails B and the tram-rails C, said yokes to this end being of a length substantially equal to the distance between the said tram-rails, and being provided at opposite ends with enlarged parts or blocks A', the flat upper surfaces of which form seats or chairs for the tram-rails C. The under surfaces of these blocks A' are in the form of V-shaped cavities $a$, the side walls of which stand at approximately right angles to each other. Extending from the upper surfaces or rail-seats downwardly to the opposite walls of said cavities are downwardly tapered slots or bolt-holes $a'$ designed to receive the bolts $c$ which are used to secure the tram-rails to the yoke. The sidewalls of the cavities form in effect bearing surfaces for the bolt-nuts at right angles to the bolt holes. As shown these bolts $c$ are at their upper ends shaped to form hooks which engage the base flange or foot of the tram rail, their opposite or lower ends being threaded to receive securing nuts $c'$ which abut against said side walls of the cavities $a$, which form bearing surfaces for the said nuts as hereinbefore stated. The bolt-holes $a'$ are downwardly tapered, and smaller at their lower than at their upper ends, and it will be apparent that owing to the tapered form of the said bolt-holes, the tram-rails C will have some slight range of lateral adjustment, and may be clamped securely to the yokes at any point within the limit of movement of the upper ends of the bolts $c$ within said tapered slots $a'$. This feature of construction to afford adjustment may be retained even though another form of bolts be used, as for instance, a headed bolt might be passed upward through the slots $a'$ and provided with a nut that would overlap the rail-foot. These yokes are provided centrally of their length with a deep bay $A^2$, the walls $a^2$ of which, define the outline of the conduit, said walls approaching each other at the top and terminating in overhanging supports $A^3$ designed for contact with and to sustain the slot-rails B of the conduit.

The slot-rails B here shown are U-shaped in cross section like those shown in prior patents granted to me, the inner flange $d$ thereof forming the side wall of the slot of the conduit. The web $d'$ of these slot rails rests upon the upper surface of the supports which rest within or fit between the inner and outer flanges $d$ and $d^2$ of said slot-rail. A chamber $a^4$ is formed in the upper surface of the yoke outside of the block $A^3$, the said chamber being formed by means of an upwardly extending flange $a^3$ on the top surface of the yoke, and being open at its side nearest the support $A^3$. In said support is formed a rectangular recess $a^5$ designed to receive a nut $a^6$ to engage a securing bolt $A^4$. This securing bolt $A^4$ is passed from the chamber $a^4$ through an aperture formed in the flange $d^2$ of the slot-rail and through a bolt hole $a^7$ in that part of the block between the chamber $a^4$, and the rectangular recess $a^5$. It will be apparent that the employment of a nut such as $a^6$ is not essential, as the bolt hole $a^7$ in the block $A^3$ may be threaded to engage the threads of the securing bolt $A^4$, but I deem the arrangement shown preferable for reasons which will occur to those skilled in metal working.

The space between the ends of the flange $a^3$ and the support $A^3$ is made somewhat wider than the thickness of the flange $d^2$ of the slot-rail to provide for any required lateral adjustment of said slot-rail, said adjustments being made in any preferred manner, as for instance, by the insertion of a wedge between the flange $d^2$ of the slot-rail and the adjacent side of the support $A^3$.

The margins of the yokes A are flanged, the bottom edge thereof being provided centrally beneath the bay $A^2$ with a strengthening web $A^5$, the edges of which latter are also flanged. This web $A^5$ does not extend to the end edges of the yoke, but meets the bottom edge thereof at some distance from the ends, so that the said bottom edge of the yoke at the corners and immediately beneath the tram rails, presents a broad horizontal surface to rest upon a bed H of concrete in which these yokes are usually laid, the better to resist the downward thrust or pressure of the rolling stock upon the tram-rails C.

At opposite sides of the chambers $a^4$ in the supports $A^3$ are lugs $A^6$ provided with recesses $a^8$ to receive and hold the opposite ends of longitudinally arranged rigid bars or plates $A^7$ which I shall hereinafter term "paving plates." These paving plates $A^7$ are of a length to extend from yoke to yoke, the ends thereof being so bent as to rest within the recesses $a^7$, while the main part of the paving plate lies closely against the flange $d^2$ of the slot-rail B. Owing to this construction the slot-rails B may be readily removed by the withdrawal of the securing bolts $A^4$ without disturbing the street pavement P as the latter abuts upon and is supported by the paving plate $A^7$ and does not come in contact with the slot-rail.

To prevent the accumulation of dirt within the chambers $a^4$ and afford a neat finish to the surface structure, said chambers are provided with covers $a^9$ from three sides of which depends a flange which fits snugly within the flanges $a^3$ forming said chamber. The cover $a^9$ is provided centrally with an aperture for the insertion of any proper tool by which it may be removed from the chamber $a^4$.

Figures 8, 9, 10:
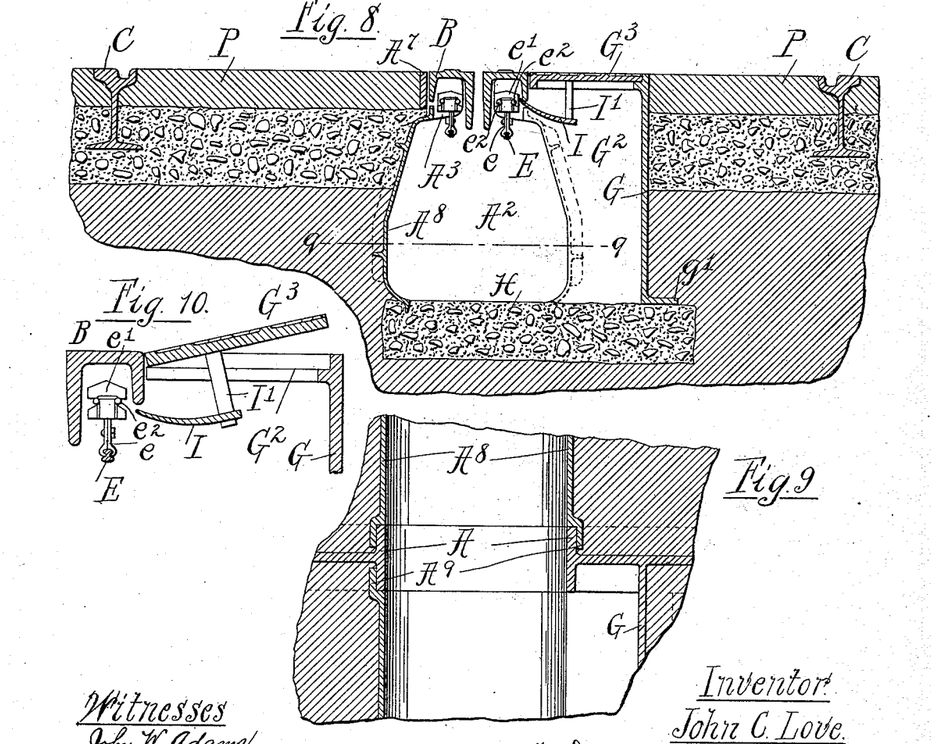
Fig. 8 is a vertical transverse section taken on the line 8—8 of Fig. 7.
Fig. 9 is a horizontal section through the conduit taken on the line 9—9 of Fig. 8.
Fig. 10 is an enlarged sectional detail of the man-hole cover and its parts shown in Fig. 7.

The side walls of the conduit are formed of curved plates or "liners" $A^8$ the ends of which are provided with off-sets $A^9$ which rest upon the side flanges of the walls $a^2$ of the yokes, as best shown in Figs. 8 and 9. The bottom edges of the liners lie in the same horizontal plane with the bottom of the bay $A^2$ formed in the yokes and join the concrete bed, so that the liners and the bed together complete the inclosure of the conduit. The top edges of said liners terminate beneath the flange $d^2$ of the slot-rails B and in close proximity thereto.

In order to afford convenient access to the conductor within the conduit and the insulating support by which it is sustained, I have provided a man-hole at the side of the conduit which opens into the conduit and the top opening of which is bordered at one side by the slot-rails so that the cover or hatch of the man-hole extends to abut against the slot-rail, thereby affording convenient access to the conductor, which is located below the slot-rail when the hatch is removed.

Figure 1:
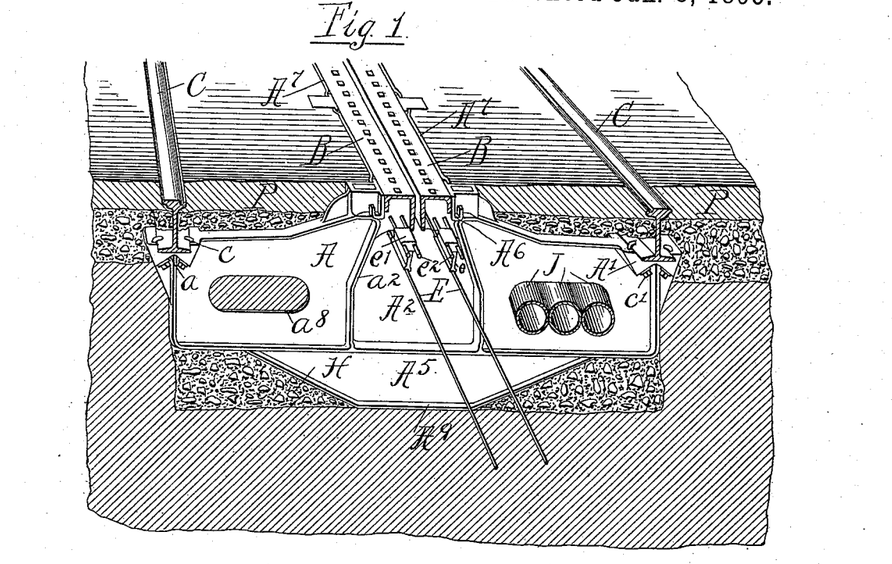
Figure 1 is a sectional perspective view of a conduit tramway embodying my improvements.
Figure 2:
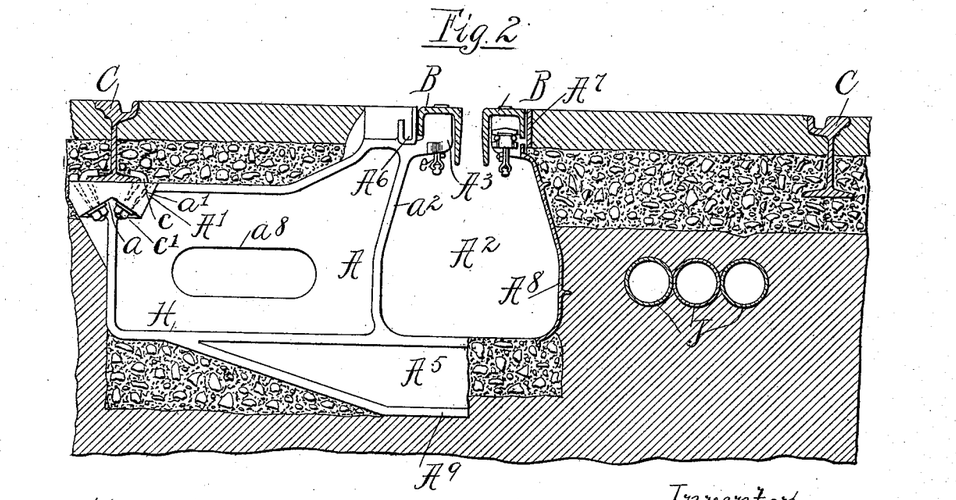
Fig. 2 is a vertical transverse section through the same.
Figure 3:
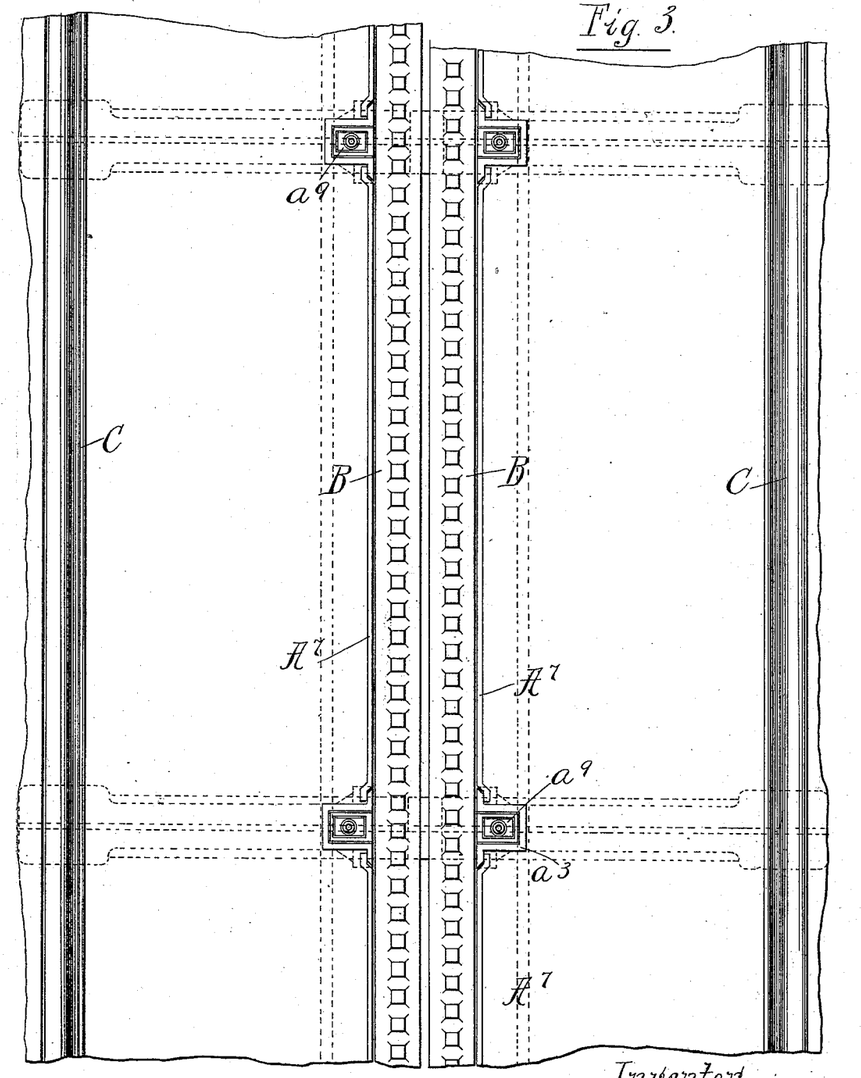
Fig. 3 is a plan view of the way or track, showing the relative positions of the yokes, slot-rails and paving plate.
Figure 4:
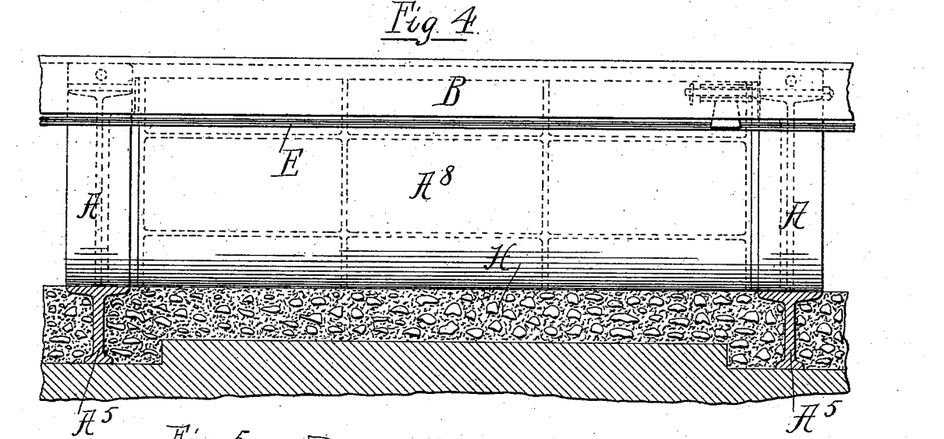
Fig. 4 is a vertical longitudinal section, taken through the conduit.
Figure 5:
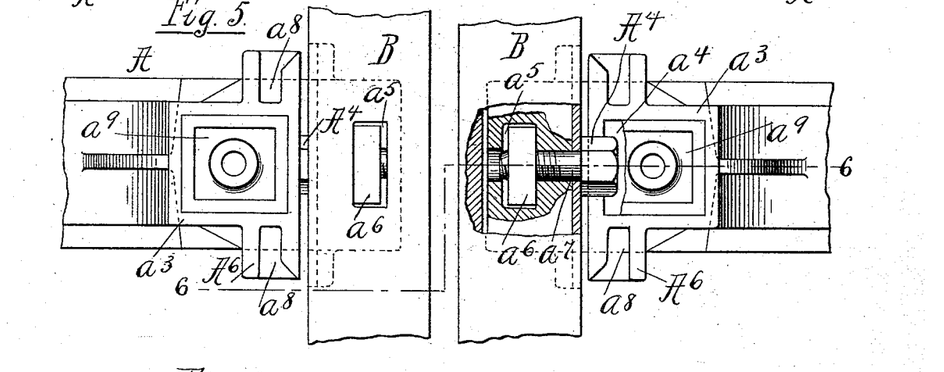
Fig. 5 is an enlarged detail plan view, partly in section, showing the manner of connecting the slot-rails to the yoke.
Figure 6:
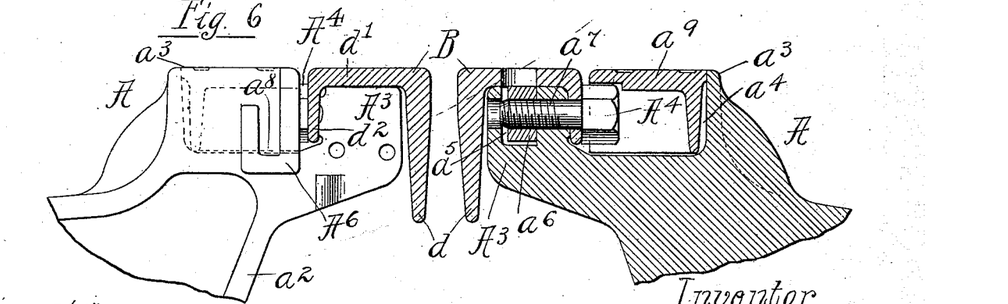
Fig. 6 is a vertical section of the same, taken on the line 6—6 of Fig. 5.
Figure 7:
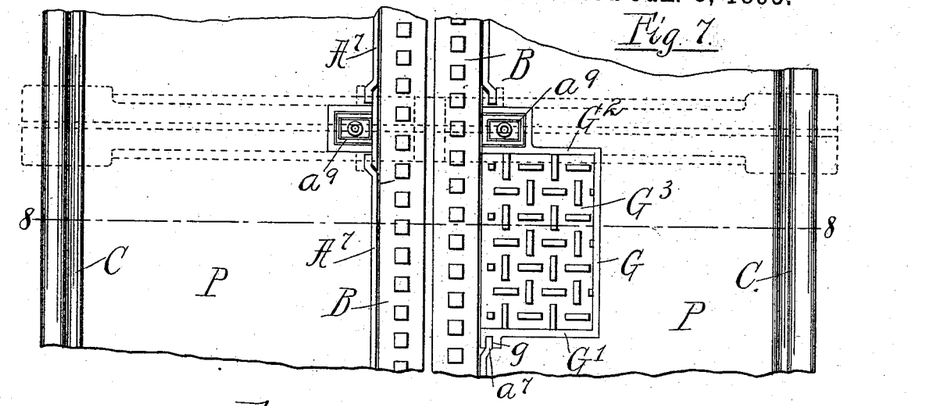
Fig. 7 is a plan view of the way or track showing the position of the man-hole with relation to a yoke and slot-rail.

As shown in the accompanying drawings, in Figs. 7, 8 and 10, the man-hole, is formed by side and end walls G and G' which are cast integral with the yokes A. The outer or side wall G which is parallel with the track rails and the transverse or end wall G' remote from the yoke is cast integral with the yoke, while the end wall $G^2$ adjacent to the yoke is formed by the central flange of the yoke itself. The hatch or cover $G^3$ rests in a suitable annular groove or rabbet formed at the upper edges of the walls G G' $G^2$, the inner edge of the said hatch resting adjacent to, but being disconnected from the slot-rail B. The wall G' is provided on its outer surface near its upper edge and adjacent to the slot-rail with a socket $g$ to receive the end of the adjacent paving plate $a^7$. The walls G G' of the man-hole are herein shown as extended downwardly to the level of the bottom of the conduit and as provided at their lower edges with an outwardly extending flange $g'$ adapted to rest on the top of the concrete bed H.

The conductors E will preferably be supported by insulating supports located adjacent to the yokes, said insulating supports comprising as herein shown, clamping jaws $e$ supported by a sliding insulating block $e'$ which is sustained in place by engagement with horizontal guide rods $e^2 e^2$ secured in the slot-rail supports $A^3$ and extending longitudinally at one side of the same.

The insulating supports described will not commonly be located at every yoke, but will be placed at a greater distance apart, while near enough together to properly sustain the conductors. A man-hole will commonly be employed in connection with each yoke at which one end of said insulating supports is located, the man-hole being located at the same side of the yoke at which the sliding block $e'$ is placed so that the man-hole will be opposite the insulating support, with the result that convenient access may be had thereto when the man-hole is opened.

As a further and separate improvement I have provided in connection with a man-hole hatch, arranged as described, a deflecting plate I designed and arranged to extend past the inner edge of the hatch and the outer flange $d^2$ of the slot-rail, its inner end edge $i$ being located, normally, between the said flange $d^2$ of the slot-rail and the insulating support $e'$ of the conductor E. A deflecting plate of this kind is shown in the drawings, (Figs. 8 and 10) as attached to the hatch $G^3$ by posts I' and as having its inner edge, or that nearest the slot-rail, extended past the adjacent edge of the hatch; the plate being inclined or arranged with its inner edge higher than its outer edge, and with its said inner edge in such position that it will enter beneath the outer flange of the slot-rail when the hatch is in place on the man-hole.

The purpose of the deflecting plate I, is to avoid any possible access to the conductor or insulating support thereof, of surface water which may pass downward between the hatch and the adjacent edge of the slot-rail, it being clear that any water entering between said parts will be deflected outwardly and will be carried away from the conductor by said plate I.

Figure 17:
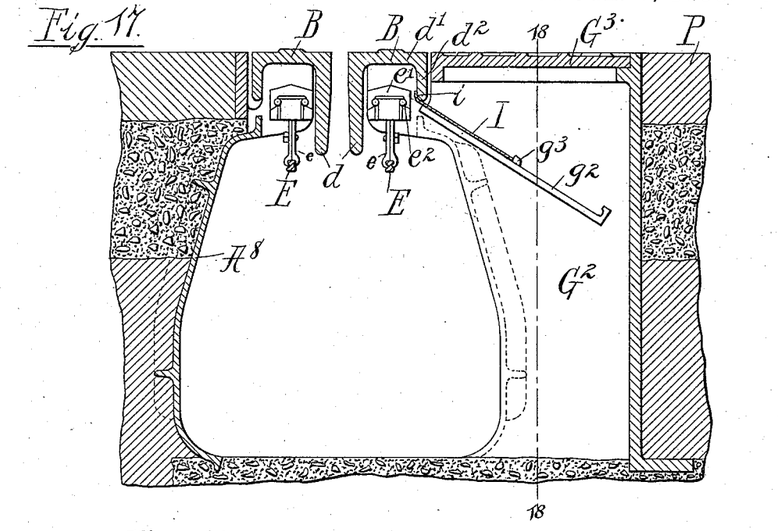
Fig. 17 is a sectional view of a man-hole, showing a modified form of the deflecting plate.
Figure 18:
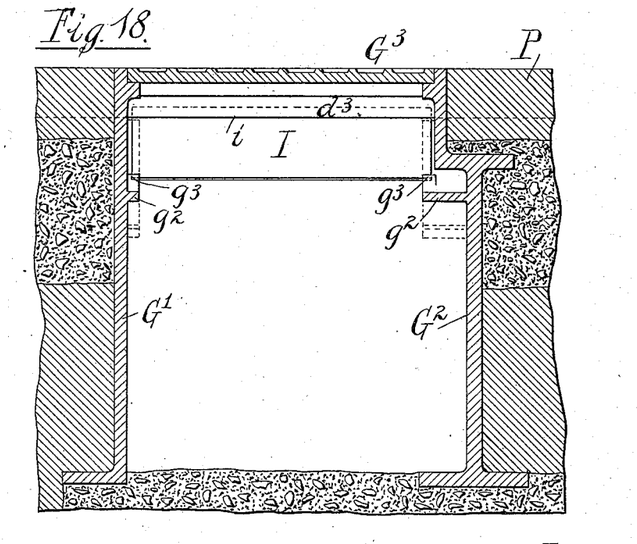
Fig. 18 is a sectional view taken on line 18—18 of Fig. 17.

Another arrangement of the deflector plate, and one having some advantage over that above described is illustrated in Figs. 17 and 18. The end walls $G' G^2$ of the hatch in this instance are provided with downwardly inclined flanges or ledges $g^2$ provided at suitable points with lugs or stops $g^3$. A loose deflected plate I, or one disconnected from the hatch cover, rests upon the ledges $g^2$ of the hatch, its upper edge $i$ being located normally, between the insulating support $e'$ and the flange $d^2$ of the slot-rail, while its bottom edge rests upon the lugs $g^3$ of the ledges $g^2$. It will be apparent that by lifting said lower edge of the deflecting plate I free from the lugs or stops $g^3$, said plate may be slid down the ledges $g^2$, thus affording access to the conductor E and its support at this point, said deflecting plate being again restored to the position first described, to afford the required protection to the conductor and its support, against surface moisture.

In the laterally extended parts of the yokes at one or both sides of the central openings of the same, are formed horizontal slots or openings $a^8$ adapted for the insertion through them of conduits J J through which may be carried the feed wires for supplying current to the conductors within the conduit, or other electric conductors, said slots or openings not only serving to permit the passage of the conduits past the yokes so that the said conduits may be in the same excavation as is necessarily made in the construction of the road, but acting also as supports for the said conduits. By thus providing the yokes with the slots $a^8$ the conduits J J may be placed in position at slight cost during the construction of the road, and threaded with conductors subsequently as they are required for the operation of the road or for other purposes.

Figure 12:
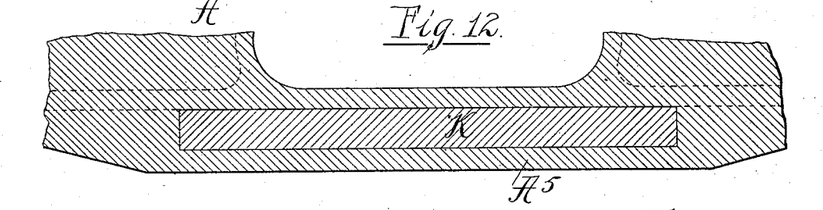
Fig. 12 is a vertical section of the lower part of the yoke.
Figure 13:
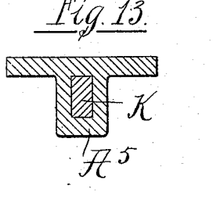
Fig. 13 is a cross-section taken on line 13—13 of Fig. 11.
Figure 14:
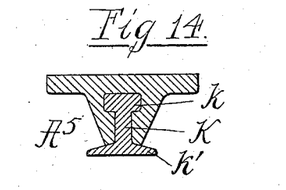
Fig. 14 is a section similar to Fig. 13, showing a modified form of the stiffening bar therein illustrated.
Figure 15:
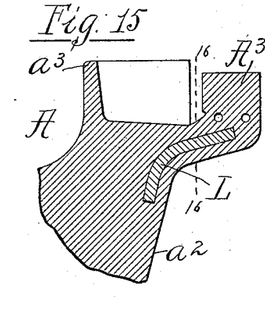
Fig. 15 is a detail vertical section of the upper part of the yoke.
Figure 16:
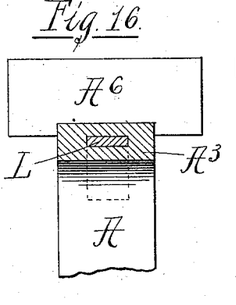
Fig. 16 is a cross-section taken on line 16—16 of Fig. 15.

The yoke A is shown in the drawings, Figs. 1 to 7, as being made of cast metal and as provided below the central opening $A^2$ with a depending web $A^5$ having at its lower margin a stiffening flange $A^9$, said web $A^5$ extending at its ends past the said central opening $A^2$ to points near the outer ends of the yoke so as to give ample stiffness or rigidity to the central part of the yoke. The web $A^5$ thus constructed will commonly project downward into the mass or bed H of concrete upon the surface of which the end portions of the yoke rest, for effectually sustaining the track-rails in the manner hereinbefore described. While the web constructed as shown in the figures above referred to will be found efficient for giving proper strength to the yoke, yet in most instances, it is desirable under some circumstances that the depth to which the excavation for the yokes extend, should be as small as possible, especially in cases where the laying of the road bed requires excavation in rock. In order therefore to provide ample strength in the yoke while making the same as shallow as possible below the conduit opening therein, I propose to employ the construction shown in Figs. 11, 12 and 13, the same embracing a horizontal stiffening bar K of steel which is embedded in the cast metal constituting the yoke, by having the same cast around the steel bar at the time of casting the yoke. In the construction shown in Figs. 11, 12 and 13, the bar K is of rectangular shape in cross-section, and the web $A^5$ is made of such thickness as to completely surround or inclose the said bar. In this instance the said web $A^5$ is shown as made without any stiffening flange, ample strength being afforded by the inclosed steel bar K. In Fig. 14 the steel bar K is shown as made in the form of an I beam having upper and lower lateral flanges $k$ $k'$ and the web $A^5$ instead of surrounding the bar, embraces the top of the upper flanges $k$ of the bar and the sides of the bar between the flanges, so that the outer parts of the lower flanges $k'$ are free or uninclosed and constitute in fact flanges for the said web $A^5$. The construction shown in Fig. 14 has the advantage of making the yoke stiffer or stronger without a corresponding increase in the weight of the steel bar.

Figure 11:
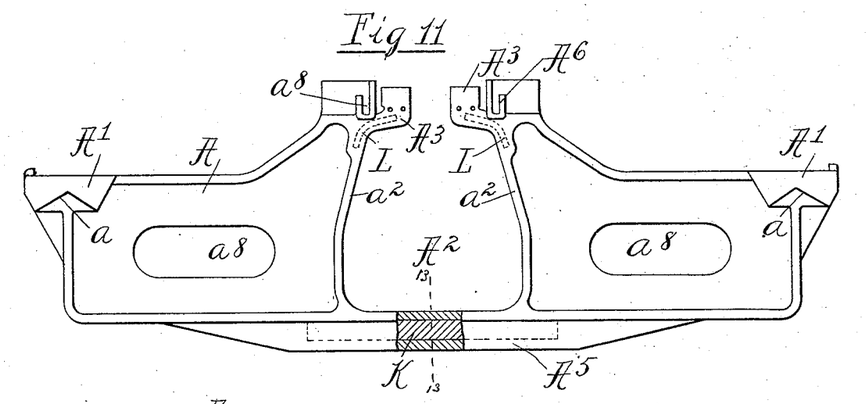
Fig. 11 is a side view of a yoke separate from other parts of the conduit.

The presence of the outer depending flange on the slot rails makes necessary the connection of the rail supports $a^3$ with the body of the yoke by a relatively narrow connecting part or neck, as clearly seen in the side view of Fig. 11. The vertical thickness of the metal at this neck is made as small as possible in order that a maximum space may be obtained with the conduit for the conducting wires, it being obviously desirable that the wires should be placed as high as possible within the conduit, not only that they may be better protected from the dripping of water by the flanges of the slot-rail, but that the space below them for the working of the trolley or traveling contact device, should be as large as possible. For the purpose therefore of making the neck referred to as thin as possible and at the same time of ample strength in a cast metal yoke, I propose to cast within the upper ends of the yoke, stiffening bars L L of steel, which stiffening bars shall extend from the body of the yoke through the neck referred to, into the lower or base portion of the slot-rail supports $a$ $a$ as clearly seen in the drawings Figs. 1, 5 and 6. The stiffening bars L L will preferably be made of wrought metal, preferably of steel. The form of said bars will be such as to correspond with the exterior form of the plates, the same being shown as curved to follow the curvature of the said flanges of the yoke. This particular form of the bars is not essential, however, and they may be otherwise shaped as may be found desirable to the form of the adjacent parts of the yokes or other circumstances. The presence of said bars L L obviously enables the necessary strength to be obtained with a much less thickness of metal than would be necessary on a yoke made entirely of cast metal.

I claim as my invention—

1. The combination with a slot-rail having a depending flange of a yoke provided with an upwardly projecting support for the slot-rail, which support is provided with a recess to receive a nut and a bolt hole extending horizontally into the recess, a nut in said recess, and a bolt inserted through the rail flange and bolt hole and engaging the said nut, substantially as described.

2. The combination with a flanged slot-rail of a yoke provided with a support for the slot-rail containing a recess to receive a nut and a bolt hole extending into said recess, said yoke being provided also with a recess or chamber outside of said support to receive a bolt-head, a bolt engaging the flange of said slot-rail and passing through the said bolt-hole and a nut located in the said recess and engaging the threaded end of the bolt, substantially as described.

3. A conduit tramway comprising slot rails having inner and outer depending flanges and cast metal yokes provided at their upper ends with integral supports for the slot rails entering between the flanges thereof, and bolts passing through the outer flanges of said slot rails and into said supports and acting to clamp the rails laterally against said supports, substantially as described.

4. A conduit tramway comprising slot rails and yokes consisting of integral castings provided at their upper ends with integral supports for the slot rails, and vertically arranged paving plates located outside of and parallel with the slot rails between the yokes, said yokes being provided at their side faces, adjacent to said supports, with vertical sockets to receive the ends of the paving plates, substantially as described.

5. A conduit tramway comprising flanged slot-rails and yokes for supporting the same and paving plates extending between the yokes, said yokes being provided at their upper ends with supports for the slot-rails provided with chambers outside of said supports to receive bolt-heads and having at opposite sides of said chambers sockets to receive the ends of the paving plates, substantially as described.

6. A conduit tramway comprising slot-rails, yokes for supporting the same provided with overhanging supports for the slot-rails, paving plates extending between the upper ends of the yokes and liner plates extending between the yokes below the slot-rails, substantially as described.

7. A conduit tramway comprising slot-rails, yokes provided at their upper ends with overhanging supports for the slot-rails, paving plates extending between the upper ends of the yokes exterior to the slot-rails and liner plates extending between the said yokes, said yokes being provided with sockets to receive the ends of the paving plates and having flanges engaging the ends of the liner plates, substantially as described.

8. A tramway conduit provided with slot-rails and with a man-hole adjacent to said slot-rails, a cover for said man-hole, and a movable deflector located within the man-hole and projecting at its upper edge past the adjacent edge of the adjacent slot-rail, substantially as described.

9. An electric tramway conduit provided with slot-rails and with conductors beneath the slot-rails, a man-hole adjacent to said slot-rails, a man-hole cover, and a movable deflector located within the man-hole and having its upper edge arranged between a conductor and the outer edge of the slot-rail, substantially as described.

10. A tramway conduit provided with slot-rails and with a man-hole, a deflector plate in the man-hole, adapted to project beneath the outer flange of the slot-rails, and inclined flanges at the sides of the man-hole for supporting said plate, substantially as described.

11. A tramway conduit provided with slot-rails and with a man-hole, a deflector plate in the man-hole adapted to project beneath the outer flange of the slot-rail, and inclined flanges at the sides of the man-hole for supporting the plate, said flanges being provided with stops to hold the plate in its operative position, substantially as described.

12. A tramway conduit provided with slot rails, and with a man-hole adjacent to said slot rails, a cover for said man-hole, and an inclined deflector located within the man-hole and with its upper edge adjacent to the slot rail and its lower edge remote therefrom, substantially as and for the purpose described.

13. A conduit tramway comprising tram-rails and yokes having lateral extensions provided at their ends with seats for the tram-rails and in said seats, downwardly converging bolt-holes and beneath said seats bearing surfaces for nuts arranged at right angles to said bolt-holes, said bolt-holes being made smaller at their lower than at their upper ends, and hook bolts inserted through said bolt-holes and engaging with the rail-flanges, substantially as described.

14. A conduit tramway comprising yokes, removable slot rails provided with depending stiffening flanges and supported by the yokes only, and a manhole opening into the conduit and having a hatch or cover which is supported at its outer and end margins only and extends at its inner edge to, and is at such inner edge free from, the adjacent slot rail, substantially as described.

15. A conduit tramway comprising yokes, removable slot rails having depending stiffening flanges and supported by the yokes only, a manhole opening into the conduit and having a side and end wall cast integral with one of the yokes, and a hatch or cover which rests on the yoke and the said side and end wall and extends at its inner edge to, and is at such inner edge free from, the adjacent slot rail, substantially as described.

16. A conduit tramway comprising a yoke, slot-rails, a concrete bed forming the bottom of the conduit, and a man-hole opening into the conduit and formed by side and end walls which are cast integral with the yoke and extend downwardly to and rest on the concrete bed, substantially as described.

17. A conduit tramway comprising a yoke, slot-rails, paving plates, and a man-hole formed by side and end walls which are cast integral with the yoke, the end wall remote from the yoke being provided with a socket for the adjacent end of the paving plate, substantially as described.

18. A yoke for a conduit tramway having a central conduit opening and provided with lateral extensions for supporting the tram-rails, said extensions having lower horizontal bearing surfaces formed by horizontal flanges which constitute also the bottom wall of the conduit opening, a central depending stiffening web extending downwardly from said flange, and containing a stiffening bar of wrought metal cast in the said stiffening web, substantially as described.

19. The combination with slot-rails having depending outer flanges of cast metal, yokes having slot-rail supports which enter between the flanges of the slot-rails, said yoke being provided with wrought metal stiffening bars embedded in the metal of the yoke and extending from the body of the yoke into said slot-rail supports, substantially as described.

In testimony that I claim the foregoing as my invention I affix my signature in presence of two witnesses.

JOHN C. LOVE.

Witnesses:
C. CLARENCE POOLE,
TAYLOR E. BROWN.